(12) United States Patent
Saito et al.

(10) Patent No.: US 8,408,630 B2
(45) Date of Patent: Apr. 2, 2013

(54) VEHICLE SEAT RECLINING APPARATUS

(75) Inventors: Takao Saito, Toyota (JP); Toshinao Wada, Miyoshi (JP); Masaki Sugimoto, Chiryu (JP)

(73) Assignees: Toyota Boshoku Kabushiki Kaisha, Kariya-Shi; Aisin Seiki Kabushiki Kaisha, Kariya-Shi ( * ) Notice: Subject to any disclaimer, the term of this patent is extended or adjusted under 35 U.S.C. 154(b) by 48 days.

(21) Appl. No.: 12/859,989

(22) Filed: Aug. 20, 2010

(65) Prior Publication Data
US 2011/0042994 A1 Feb. 24, 2011

(30) Foreign Application Priority Data
Aug. 21, 2009 (JP) .................... 2009-192069

(51) Int. Cl.
*B60N 2/10* (2006.01)
(52) U.S. Cl. .............. 296/65.13; 296/65.16; 297/341
(58) Field of Classification Search .............. 296/65.13, 296/65.1, 65.16, 155; 297/336; 248/503.1
See application file for complete search history.

(56) References Cited

U.S. PATENT DOCUMENTS

| | | | | |
|---|---|---|---|---|
| 5,368,355 A * | 11/1994 | Hayden et al. | ............ | 296/65.13 |
| 5,695,247 A * | 12/1997 | Premji | ............ | 297/341 |
| 6,523,899 B1 * | 2/2003 | Tame | ............ | 297/331 |
| 6,698,835 B2 * | 3/2004 | Kojima et al. | ............ | 297/344.1 |
| 6,997,499 B2 * | 2/2006 | Tsubaki et al. | ............ | 296/65.13 |
| 7,000,990 B1 * | 2/2006 | Liu et al. | ............ | 297/336 |
| 7,984,949 B2 * | 7/2011 | McMillen et al. | ............ | 297/284.9 |
| 2009/0322113 A1 * | 12/2009 | Parnaik et al. | ............ | 296/37.16 |

FOREIGN PATENT DOCUMENTS

| | | |
|---|---|---|
| CA | 2373917 C | 9/2008 |
| DE | 807336 B | 4/1951 |
| DE | 2851129 A1 | 6/1980 |
| DE | 10317926 A1 | 2/2004 |
| DE | 102004015450 A1 | 11/2005 |
| DE | 202008008312 U1 | 12/2009 |
| DE | 10057724 B4 | 1/2010 |
| EP | 0800952 B1 | 9/1999 |
| EP | 1531080 A2 | 5/2005 |
| FR | 2180325 A5 | 11/1973 |
| JP | 2006-021689 | 1/2006 |
| WO | 2005/032877 A1 | 4/2005 |

OTHER PUBLICATIONS

Germany Office action, dated Jun. 14, 2012 along with an english translation thereof.

* cited by examiner

*Primary Examiner* — Glenn Dayoan
*Assistant Examiner* — Pinel Romain
(74) *Attorney, Agent, or Firm* — Greenblum & Bernstein, P.L.C.

(57) ABSTRACT

A slide member is slidable along a slide rail provided at a vehicle-body side portion. When lock pawls provided at the slide member are engaged with the slide rail, the slide member is locked. The slide member is unlocked by operating an operation cable connected to the lock pawls. The operation cable is fitted to a fitting portion of an attachment bracket connected to the slide rail. A portion from a fixed portion fixed to the fitting portion to a movable portion (one end portion) extends through a region where a non-contact portion is disposed, and does not contact the non-contact portion. The movable portion is connected to the slide member and moved integrally with the slide member.

5 Claims, 11 Drawing Sheets

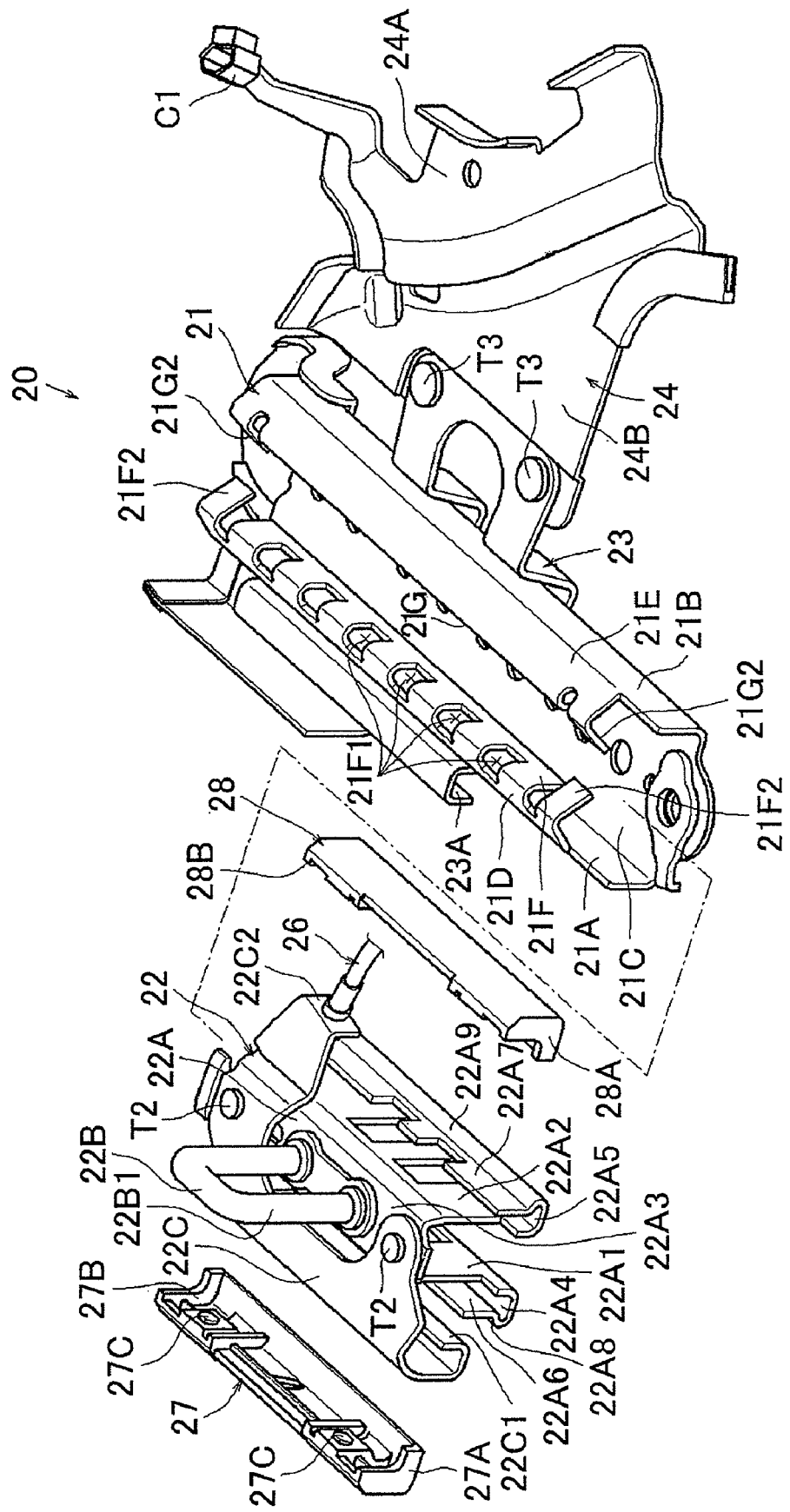

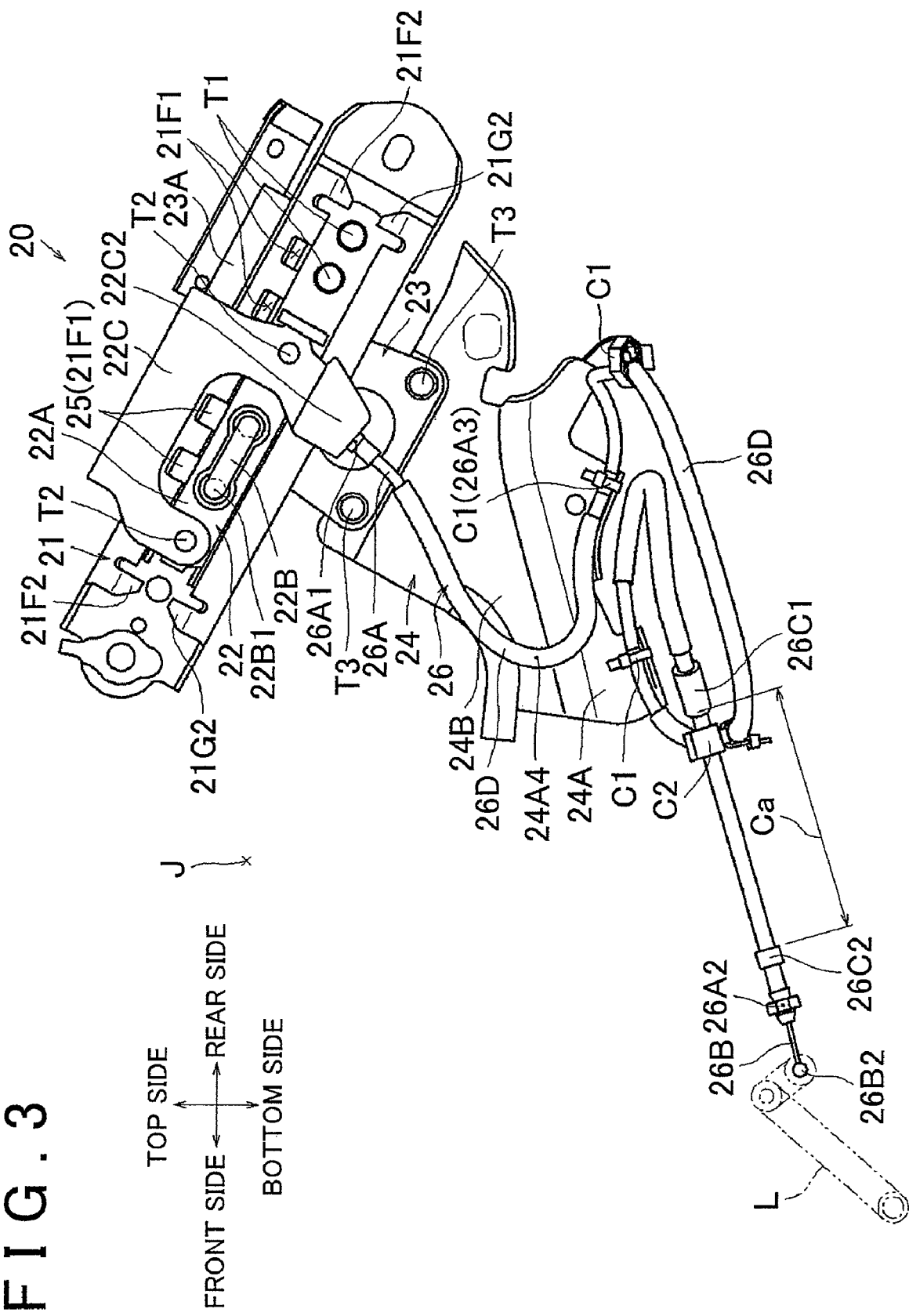

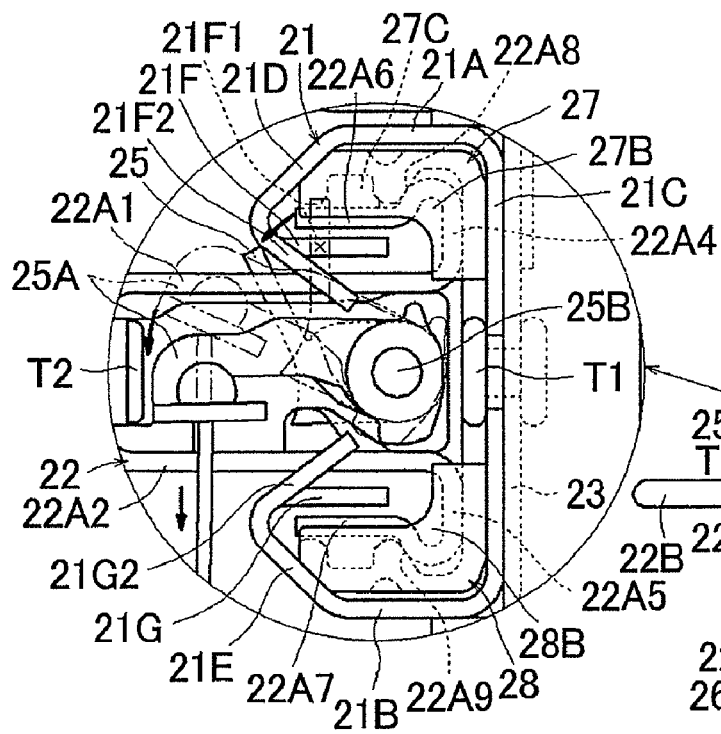
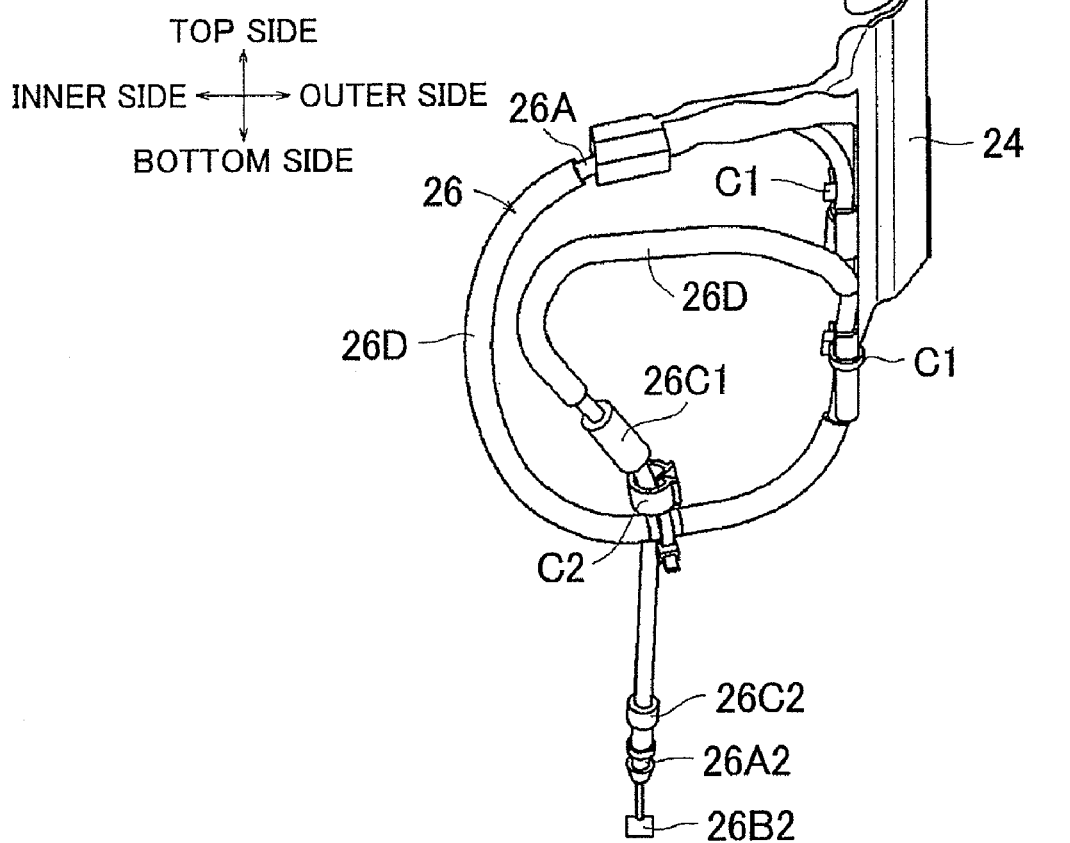

VEHICLE SEAT RECLINING APPARATUS

INCORPORATION BY REFERENCE

The disclosure of Japanese Patent Application No. 2009-192069 filed on Aug. 21, 2009 including the specification, drawings and abstract is incorporated herein by reference in its entirety.

BACKGROUND OF THE INVENTION

1. Field of the Invention

The invention relates to a vehicle seat reclining apparatus. More specifically, the invention relates to a vehicle seat reclining apparatus in which when an engagement device provided at a seatback is engaged with a slide member provided at a vehicle-body side portion, and the slide member is slid forward and rearward along a slide rail provided at the vehicle-body side portion, the seatback is tilted in a direction in which the slide member is slid; and when the slide member is restricted from being slid along the slide rail, tilting of the seatback is stopped and the seatback is held.

2. Description of the Related Art

A mechanism for unlocking a slider that is slidably provided in a slide rail provided in a vehicle has been known. In the mechanism, the slider is provided with a lock pawl that is engaged with the slide rail to lock the slider. When an operation cable connected to the lock pawl is pulled, the lock pawl is disengaged from the slide rail, and thus, the slider is unlocked.

Japanese Patent Application Publication No. 2006-21689 (JP-A-2006-21689) describes a technology relating to routing of an operation cable connected to a lock pawl provided on the slider. In the technology, an end portion of the operation cable, which is connected to the lock pawl, pivots in accordance with the movement of the slider. A predetermined portion of the operation cable is fixed to a fixed body, such as a vehicle-body panel, so that the route of the operation cable does not greatly vary.

More specifically, the operation cable is fixed to the fixed body in a manner such that the portion of the operation cable, which pivots, has a certain extra length. The operation cable is fixed to the fixed body at a center portion in the range of sliding movement of the slider, in order to minimize the extra length.

However, in the technology described in the publication No. 2006-21689, the slack portion of the cable, which has the extra length, may contact and rub against the other portion such as the fixed body, due to the sliding movement of the slider. Thus, the cable may be worn.

SUMMARY OF THE INVENTION (US)

The invention reduces the possibility that an operation cable, which is moved integrally with a slide member, contacts the other member, and rubs against the other member.

A first aspect of the invention relates to a vehicle seat reclining apparatus that includes an engagement device provided at a seatback; a slide member that is provided at a vehicle-body side portion, and that is engaged with the engagement device; a slide rail which is provided at the vehicle-body side portion, and along which the slide member is slid forward and rearward. The seatback is tilted in a direction in which the slide member is slid, and tilting of the seatback is stopped and the seatback is held by restricting the slide member from being slid along the slide rail. The vehicle seat reclining apparatus further includes a lock member provided at the slide member, wherein the slide member is locked by engaging the lock member with the slide rail, and an operation cable that is connected to the lock member, wherein the lock member is disengaged from the slide rail by operating the operation cable; and an attachment member which is connected to the slide rail, and to which the operation cable is fitted. The attachment member has a stepped shape, and includes a fitting portion which contacts the operation cable, and to which the operation cable is fitted, and a non-contact portion that is recessed with respect to the fitting portion, and that is away from the operation cable and does not contact the operation cable. A portion of the operation cable from a fixed portion to a movable portion extends through a region where the non-contact portion is disposed, and does not contact the non-contact portion, the fixed portion being fixed at a position on the fitting portion of the attachment member, and the movable portion being connected to the slide member.

According to the first aspect, the operation cable contacts the fitting portion of the attachment member, and is fitted to the fitting portion. The portion of the operation cable from the fixed portion to the movable portion extends through the region where the non-contact portion is disposed, and does not contact the non-contact portion. The fixed portion is fixed on the fitting portion of the attachment member, and the movable portion is connected to the slide member. Therefore, the portion of the operation cable, which pivots to a large extent integrally with the slide member, does not contact the attachment member, or hardly contacts the attachment member. This reduces friction due to contact.

In the above-described first aspect, the operation cable may be bent into an arc shape or a curved shape so that a direction in which the fixed portion of the operation cable is directed is substantially perpendicular to a direction in which the movable portion of the operation cable is directed; and the fixed portion and the movable portion may be directed so that, when the slide member is slid in a range of movement thereof, a bending direction of the operation cable is not likely to be changed.

According to the above-described aspect, the operation cable is bent in the above-described manner. Therefore, as compared to the case where the fixed portion and the movable portion are directed in the same direction, the radius of the curve of the operation cable is large when the operation cable is deflected and deformed. Accordingly, it is possible to reduce a load applied to the operation cable due to the curve of the operation cable. Also, the operation cable is bent in advance in the above-described manner, that is, the fixed portion and the movable portion are directed so that the bending direction is not likely to be changed when the slide member is slid in the range of movement thereof. Therefore, the operation cable is more unlikely to contact the non-contact portion of the attachment member.

In the above-described aspects, the portion of the operation cable, which extends from the position on the fitting portion of the attachment member through the region where the non-contact portion is disposed, may be gradually inclined toward the non-contact portion.

According to the above-described aspect, the portion of the operation cable, which extends from the fixed portion fixed on the fitting portion to the movable portion, is gradually inclined toward the non-contact portion. Therefore, as compared to the case where the operation cable extends in a straight line from the position on the fitting portion, the radius of the curve of the operation cable is large when the operation cable is deflected and deformed. Accordingly, it is possible to reduce the load applied to the operation cable due to the curve of the operation cable.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein

FIG. 2 is an exploded perspective view of a slider device;

FIG. 3 is a front view of the slider device;

FIG. 4A is a side view showing the slider device obliquely seen from a bottom side in a rear side of a vehicle;

FIG. 4B is an enlarged view showing a portion of FIG. 4A;

DETAILED DESCRIPTION OF EMBODIMENTS

Hereinafter, an embodiment of the invention will be described with reference to the drawings.

Figure 1:
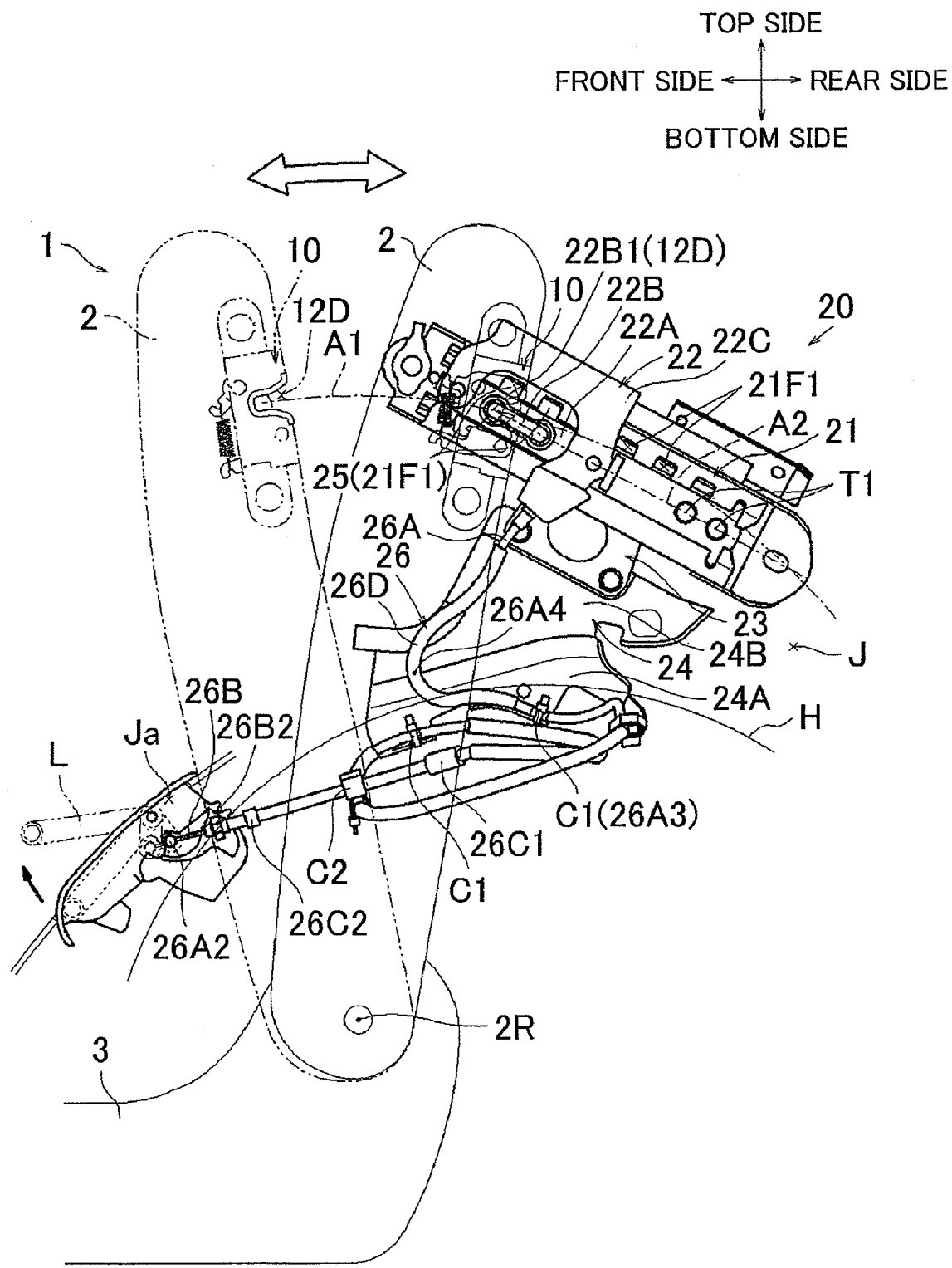
FIG. 1 is a side view showing the configuration of a vehicle seat reclining apparatus according to a first embodiment of the invention.

First, the configuration of a vehicle seat reclining apparatus according to a first embodiment will be described with reference to FIG. 1 to FIG. 11. As shown in FIG. 1, the vehicle seat reclining apparatus according to the embodiment has a function of adjusting a backrest angle of a seatback 2 of a vehicle seat 1. The vehicle seat 1 is configured as a seat in the second row behind a driver's seat in a vehicle in which seats are arranged in three rows. The vehicle seat 1 includes the seatback 2 that serves as a backrest, and a seat cushion 3 that serves as a seat portion.

The vehicle seat reclining apparatus includes a lock device 10 provided at an outer edge portion of a rear side of the seatback 2 of the vehicle seat 1; and a slider device 20 provided at a vehicle-body side portion J. The slider device 20 is engageable with the lock device 10. Thus, the vehicle seat reclining apparatus has an engagement structure. The lock device 10 may be regarded as an engagement device according to the invention. Lower end portions of right and left sides of the seatback 2 are pivotably hinge-connected to rear end portions of right and left sides of the seat cushion 3, respectively. The seat cushion 3 is fixed on a vehicle floor.

Thus, the seatback 2 is configured to freely tilt and pivot toward a front side and a rear side of the vehicle with respect to the seat cushion 3, around a connection point 2R to which the seatback 2 is hinge-connected. When the seatback 2 with the above-described configuration pivots rearward, and the lock device 10 provided at the rear side of the seatback 2 is pressed to engage with a striker 22B of the slider device 20, which is prevented from being slid, the seatback 2 is fixed to the vehicle-body side portion J and prevented from pivoting. Thus, the backrest angle is fixed and maintained.

The striker 22B is normally locked and prevented from being slid along a slide rail 21. When an operation lever L provided at the vehicle-body side portion J is pulled upward, the striker 22B is unlocked so that the striker 22B is movable forward and rearward along the slide rail 21 in a longitudinal direction of the slide rail 21. Accordingly, when the seatback 2, which is engaged with the striker 22B, is tilted rearward or forward in this situation, the striker 22B is slid in a direction in which the seatback 2 is tilted, and thus, the seatback 2 is adjusted to a desired backrest angle position.

After the seatback 2 is adjusted to the desired backrest angle position, the operation lever L is released, and the striker 22B is locked. As a result, the seatback 2 is maintained at the adjusted backrest angle position. Hereinafter, the configuration of each portion of the above-described vehicle seat reclining apparatus will be described in detail. First, the configuration of the slider device 20 will be described with reference to FIG. 1 to FIG. 6.

As shown in FIG. 2 to FIG. 3, the slider device 20 includes the slide rail 21, a slide member 22, a support bracket 23, an attachment bracket 24, lock pawls 25, an operation cable 26, an upper resin member 27, and a lower resin member 28. The attachment bracket 24 may be regarded as an attachment member according to the invention. The lock pawls 25 may be regarded as a lock member according to the invention. More specifically, the slide rail 21 is formed by bending an elongate steel plate in a short-side direction so that the slide rail 21 has a frame portion. As shown in FIG. 1 and FIG. 3, the slide rail 21 is disposed at a position immediately above a tire house H (refer to FIG. 1) so that the slide rail 21 obliquely extends upward in a direction from the rear side of the vehicle toward the front side of the vehicle. The slide rail 21 is fixed to the vehicle-body side portion J.

More specifically, as shown in FIG. 2 and FIGS. 4A and 4B, the slide rail 21 includes an upper surface portion 21A, a lower surface portion 21B, a side surface portion 21C, an upper inclined surface portion 21D, a lower inclined surface portion 21E, an upper bent surface portion 21F, and a lower bent surface portion 21G. Thus, the slide rail 21 has the frame portion, and an open cross section. The upper surface portion 21A and the lower surface portion 21B are formed by bending the steel plate so that the upper surface portion 21A and the lower surface portion 21B extend perpendicularly from the side surface portion 21C. The upper surface portion 21A and the lower surface portion 21B face each other.

The upper inclined surface portion 21D and the lower inclined surface portion 21E are formed by further bending the steel plate so that the upper inclined surface portion 21D obliquely extends from a distal edge portion of the upper surface portion 21A toward the lower inclined surface 21E, and the lower inclined surface portion 21E obliquely extends from a distal edge portion of the lower surface portion 21B toward the upper inclined surface 21D, and thus, the upper inclined surface portion 21D and the lower surface portion 21D are inclined. The upper bent surface portion 21F and the lower bent portion 21G are formed by further bending the steel plate so that the upper bent surface portion 21F and the lower bent surface portion 21G extend from distal edge portions of the upper inclined surface portion 21D and the lower inclined surface 21E, respectively, toward an inner portion inside the frame portion of the slide rail 21, that is, toward the side surface portion 21C. An open gap is formed between the upper bent surface portion 21F and the lower bent surface portion 21G.

As shown in FIG. 2, in the upper bent surface portion 21F, a plurality of engagement holes 21F1 (six engagement holes 21F1 in the embodiment) are disposed at equal intervals in a longitudinal direction thereof. The lock pawls 25 provided at the slide member 22 (described later) are inserted in the engagement holes 21F1. Stopper pieces 21F2 are formed at end portions of the upper bent surface portion 21F in the longitudinal direction thereof. Stopper pieces 21G2 are formed at end portions of the lower bent surface portion 21G in the longitudinal direction thereof. The stopper pieces 21F2 extend toward the stopper pieces 21G2, and the stopper pieces 21G2 extend toward the stopper pieces 21F2. The stopper pieces 21F2 and 21G2 are functional portions that restrict a range in which the slide member (described later) is slid, by contacting the slide member 22. The stopper pieces 21F2 and 21G2 prevent the slide member 22 from falling from the open end portions of the slide rail 21 in the longitudinal direction thereof.

As shown in FIG. 2 to FIGS. 4A and 4B, the side surface portion 21C of the slide rail 21 is placed adjacent to the vehicle-body side portion J, and fastened and fixed to the vehicle-body side portion J through a plurality of fastening pins T1, in a manner such that the support bracket 23 made of steel is disposed between the side surface portion 21C of the slide rail 21 and the vehicle-body side portion J. Next, referring again to FIG. 2, the configuration of the slide member 22 will be described. The slide member 22 includes a slider 22A that is fitted to the slide rail 21 so that the slider 22A is slidable along the slide rail 21, the striker 22B provided integrally on the slider 22A, and a separation prevention bracket 22C that is provided integrally on the slider 22A, and functions to increase the strength for preventing the slider 22A from separating from the slide rail 21.

More specifically, the slider 22A is formed by bending a steel plate with a length shorter than the length of the slide rail 21 so that the slider 22A has a hat shape that fits the shape of in the inner portion inside the frame portion of the slide rail 21. More specifically, as shown in FIG. 2 and FIGS. 4A and 4B, the slider 22A includes an upper surface portion 22A1, a lower surface portion 22A2, a side surface portion 22A3, an upper side surface portion 22A4, a lower side surface portion 22A5, an upper fin surface portion 22A6, and a lower fin surface portion 22A7. Thus, the slider 22A has a hat shape.

The upper surface portion 22A1 and the lower surface portion 22A2 are formed by bending the steel plate so that the upper surface portion 22A1 and the lower surface portion 22A2 extend perpendicularly from the side surface portion 22A3. The upper surface portion 22A1 and the lower surface portion 22A2 face each other. The distance between the upper surface portion 22A1 and the lower surface portion 22A2 of the slider 22A is smaller than the width of the open gap between the upper bent surface portion 21F and the lower bent surface portion 21G of the slide rail 21. The slider 22A is fitted to the slide rail 21 in a manner such that the upper surface portion 22A1 and the lower surface portion 22A2 are inserted in the open gap. Thus, the slider 22A is fitted to the slide rail 21 so that the slider 22A is slidable along the slide rail 21, that is, along the open gap that extends in the longitudinal direction thereof (refer to FIGS. 4A and 4B).

Referring again to FIG. 2, the upper side surface portion 22A4 and the lower side surface portion 22A5 are formed by further bending the steel plate so that the upper side surface portion 22A4 extends perpendicularly from a distal edge portion of the upper surface portion 22A1 toward a side opposite to a side where the lower side surface portion 22A5 is provided, and the lower side surface portion 22A5 extends perpendicularly from a distal edge portion of the lower surface portion 22A2 toward a side opposite to a side where the upper side surface portion 22A4 is provided. The upper fin surface portion 22A6 and the lower fin surface portion 22A7 are formed by further bending the steel plate so that the upper fin surface portion 22A6 extends from a distal edge portion of the upper side surface portion 22A4 to face the upper surface portion 22A1 or the lower surface portion 22A2, and the lower fin surface portion 22A7 extends from a distal edge portion of the lower side surface portion 22A5 to face the upper surface portion 22A1 or the lower surface portion 22A2.

The upper fin surface portion 22A6 and the lower fin surface portion 22A7 are fitted to the slide rail 21 in a manner such that the upper fin surface portion 22A6 is inserted in a gap between the upper inclined surface portion 21D and the upper bent surface portion 21F of the slide rail 21, and the lower fin surface portion 22A7 is inserted in a gap between the lower inclined surface portion 21E and the lower bent surface portion 21G of the slide rail 21. Thus, the slider 22A is supported in the slide rail 21 by the upper fin surface portion 22A6 and the lower fin surface portion 22A7 so that the slider 22A is prevented from falling from the open gap between the upper bent surface portion 21F and the lower bent surface portion 21G (that is, the slider 22A is prevented from separating from the slide rail 21).

The striker 22B, which is formed using a U-shaped pipe member, is provided integrally on the side surface portion 22A3 exposed in the open gap of the slide rail 21. The striker 22B is oriented so that both leg portions are arranged in a direction in which the slider 22A is slid forward and rearward along the slide rail 21. The leg portion at the front side is formed as an engagement portion 22B1 that is caught by, and engaged with the lock device 10 provided at the rear portion of the seatback 2.

The separation prevention bracket 22C made of a steel plate contacts the side surface portion 22A3 of the slider 22A. That is, the separation prevention bracket 22C is provided integrally on the side surface portion 22A3. The separation prevention bracket 22C is formed to have an opening to avoid a region where the striker 22B is disposed. The separation prevention bracket 22C is fastened and fixed integrally to the side surface portion 22A3 of the slider 22A using a plurality of fastening pins T2 in a manner such that the separation prevention bracket 22C contacts the side surface portion 22A3. As shown in FIG. 4A, the separation prevention bracket 22C is formed to have a shape that extends to cover an upper half portion of the slide rail 21 (i.e., the upper surface portion 21A and the upper inclined surface portion 21D) from an inner side in FIG. 4A. A hook portion 22C1, which is formed to have a hook shape by bending the steel plate, is provided at a distal edge of the separation prevention bracket 22C.

The hook portion 22C1 is engaged with a hook portion 23A formed at an upper edge portion of the support bracket 23 that is integrated with the slide rail 21. This engagement structure further increases the strength for preventing the slider 22A from separating from the slide rail 21. Also, as shown in FIG. 3, a connection portion 22C2 is formed at a lower extending portion of the separation prevention bracket 22C. One end portion 26A1 of an outer tube 26A of the operation cable 26 (described later) is connected to the connection portion 22C2.

An upper end portion of the attachment bracket 24 made of a steel plate is fastened and fixed integrally to the lower extending portion of the support bracket 23 using a plurality of fastening pins T3 in a manner such that the attachment bracket 24 is suspended from the lower extending portion of the support bracket 23. The attachment bracket 24 functions as a routing plate that fixes a route along which the operation cable 26 extends. The operation cable 26 is used to perform an operation for unlocking the slider 22A so that the slider 22A is slidable along the slide rail 21.

When the lock pawls 25, which are provided in the slider 22A to be rotatable around an axis of a rotation shaft 25B, are inserted in the engagement holes 21F1 formed on the slide rail 21, the slider 22A is locked at a position in the slide rail 21. The lock pawls 25 are disposed in the gap between the upper surface portion 22A1 and the lower surface portion 22A2. The lock pawls 25 are integrally connected to the rotation shaft 25B that is connected to the slider 22A to be rotatable around the axis thereof. Thus, the lock pawls 25 are supported by the rotation shaft 25B to be rotatable with respect to the slider 22A.

The lock pawls 25 are normally urged in a clockwise direction in FIGS. 4A and 4B by the urging force of a spring member (not shown) provided between the lock pawls 25 and the slider 22A. Distal portions of the lock pawls 25 protrude from an open window (not shown) formed in the upper surface portion 22A1 of the slider 22A, and the distal portions of the lock pawls 25 are inserted in the engagement holes 21F1 formed in the slide rail 21. The lock pawls 25 are normally maintained in this state. Thus, the sliding movement of the slider 22A along the slide rail 21 is normally restricted by the lock pawls 25 inserted in the engagement holes 21F1 of the slide rail 21.

When an operation arm 25A, which is integrally connected to the rotation shaft 25B, is rotated in a counterclockwise direction in FIGS. 4A and 4B by the operation cable 26, the lock pawls 25, which have been engaged with the engagement holes 21F1 of the slide rail 21 by the urging force, are disengaged from the engagement holes 21F1. More specifically, when the operation arm 25A is rotated in the counterclockwise direction, the lock pawls 25 are rotated in a direction in which the lock pawls 25 are disengaged from the engagement holes 21F1 of the slide rail 21. As a result, the slider 22A is unlocked so that the slider 22A is slidable along the slide rail 21.

The operation cable 26 is connected to the operation lever L provided at the vehicle-body side portion J in FIG. 1. When the operation lever L is pulled upward, a pulling operation is performed, that is, the operation arm 25A shown in FIGS. 4A and 4B is pulled so that the slider 22A is unlocked. In the operation cable 26, a flexible inner wire 26B in a linear form is inserted in a flexible outer tube 26A. That is, the operation cable 26 has a double cable structure. An outer peripheral portion of the outer tube 26A is covered with a protective tube 26D to prevent damage to the outer tube 26A due to contact between the outer tube 26A and the other disposed member.

As shown in FIG. 3, the one end portion 26A1 of the outer tube 26A, which is located at an upper end side in FIG. 3, is fitted to, and connected to the connection portion 22C2 formed at the lower extending portion of the separation prevention bracket 22C. The one end portion 26A1 of the outer tube 26A, which is located at the upper end side in FIG. 3, may be regarded as a movable portion according to the invention. As shown in FIG. 4A, one end portion 26B1 of the inner wire 26B, which protrudes from the one end portion 26A1 of the outer tube 26A, is fitted to, and fixed to a distal end portion of the operation arm 25A.

Thus, when the operation cable 26 is operated so that the one end portion 26B1 of the inner wire 26B is pulled toward the other end side, with respect to the outer tube 26A, the operation arm 25A is pulled in the counterclockwise direction in FIG. 4A. As shown in FIG. 3, the operation cable 26 is fixed to the attachment bracket 24 using first clamps C1 in a manner such that the operation cable 26 is bent at certain positions to have an extra length.

As shown in FIG. 4A, a portion of the outer tube 26A is looped, that is, a looped portion is formed. Meeting portions of the looped portion, which meet each other, are connected using a second clamp C2. As shown in FIG. 3, the second clamp C2 is fixed to the meeting portion of the looped portion of the outer tube 26A, at which the operation cable 26 starts to be curved. The other meeting portion of the looped portion, which is closer to a terminal end side of the operation cable 26 (i.e., an end side connected to the operation lever L) than the one meeting portion of the looped portion, is loosely inserted through the second clamp C2. Thus, the operation cable 26 is guided by the second clamp C2 so that the operation cable 26 is movable in the axial direction.

Figure 11:
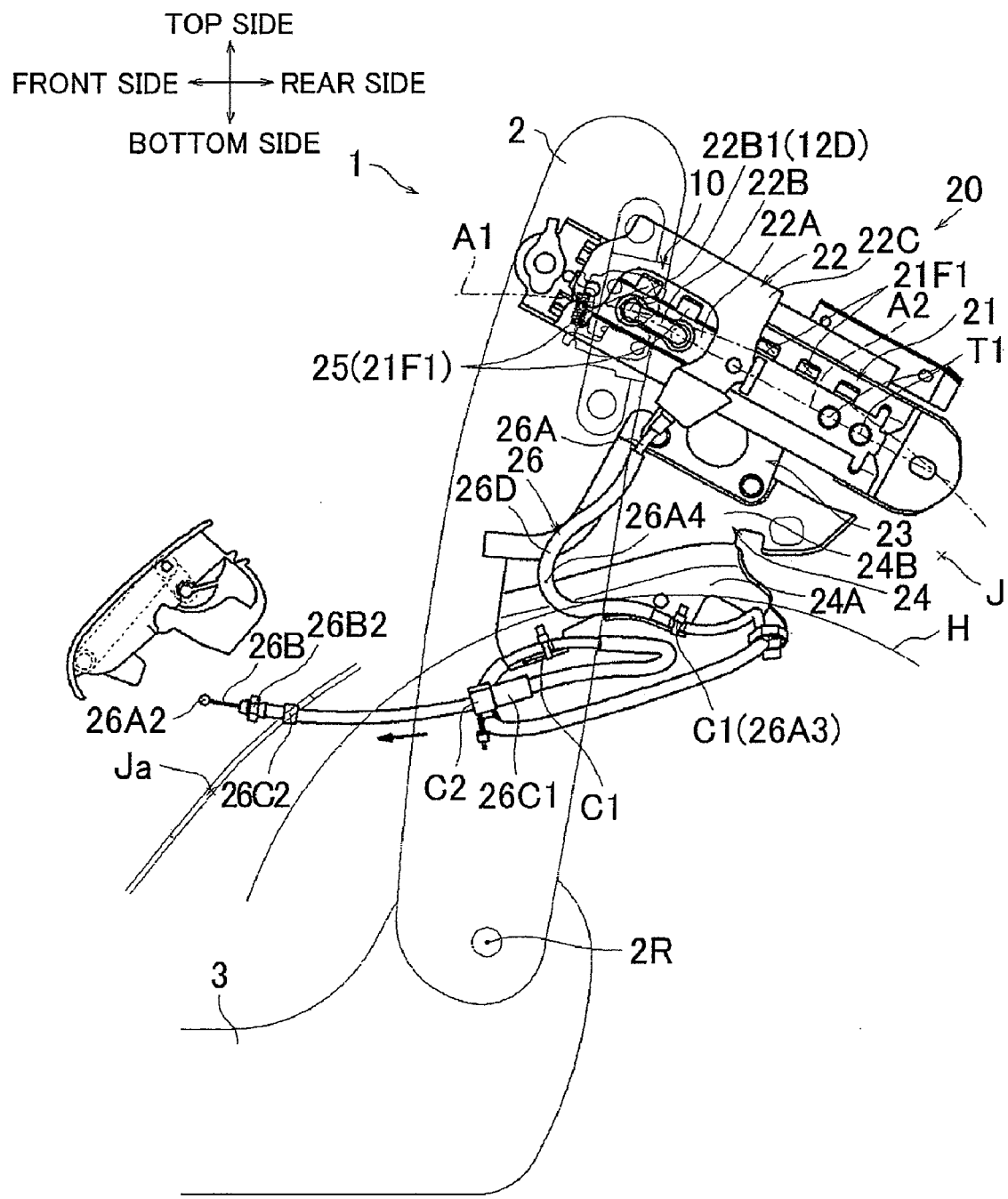
FIG. 11 is a schematic diagram showing a situation where an end portion of an operation cable is pulled out from an opening of a vehicle-body side portion.

Because the operation cable 26 is disposed to have the extra length, when performing an operation of connecting the operation cable 26 to the operation lever L, it is possible to perform an operation of pulling the terminal end portion of the operation cable 26 from an opening portion Ta formed at the vehicle-body side portion J at which the operation lever L is disposed, and connecting the terminal end portion of the operation cable 26 to the operation lever L, that is, fixing the other end portion 26A2 of the outer tube 26A and the other end portion 26B2 of the inner wire 26B at predetermined locations in the operation lever L, in a large place distant from the opening portion Ja, as shown in FIG. 11.

At this time, because the operation cable 26 is fixed to the attachment bracket 24 using the first clamps C1, if the operation cable 26 is pulled to a larger extent than necessary, an excessive pull force is applied to portions of the operation cable 26, and the operation cable 26 may be damaged. Accordingly, in the embodiment, a mechanism that restricts a pulling amount of the operation cable 26 is employed to prevent the operation cable 26 from being pulled out to a larger extent than necessary.

More specifically, a cylindrical first stopper 26C1 is fixed on the looped portion of the outer tube 26A formed by looping the operation cable 26. The first stopper 26C1 has a size that cannot pass through the second clamp C2. When the operation cable 26 is pulled toward the terminal end side by a predetermined amount, the first stopper 26C1 contacts the second clamp C2, and restricts the movement of the operation cable 26 so that the operation cable 26 is not pulled toward the terminal end side any more.

More specifically, when the operation cable 26 is pulled and the first stopper 26C1 contacts the second clamp C2, an operational force for pulling the operation cable 26 is softly received by the operation cable 26 when the entire portion of the operation cable 26, which is located between the first clamps C1, is deflected and deformed elastically to a large extent.

Thus, in the situation where the first stopper 26C1 contacts the second clamp C2, the elastic resisting force against the operational force for pulling out the operation cable 26 gradually increases due to the deformation of the operation cable 26. Thus, before the load applied to the operation cable 26 becomes extremely large, an operator is aware that the pulling operation should be stopped. More specifically, the load is applied, through the second clamp C2, to the operation cable 26 that is supported by the attachment bracket 24 in a manner such that the operation cable 26 is bent to have the extra length.

Thus, the load is not locally applied to the operation cable 26, that is, the load on the operation cable 26 is widely dispersed. Therefore, even if the operation cable 26 is further pulled out to a certain extent in the situation where the first stopper 26C1 contacts the second clamp C2, a large local load is not likely to be applied to the operation cable 26. This prevents the operation cable 26 from being damaged. Referring back to FIG. 3, the other end portion 26A2, which is located at the terminal end side of the operation cable 26, is provided with a cylindrical second stopper 26C2 that has a size that cannot pass through the second clamp C2, as well as the first stopper 26C1.

Thus, when the second stopper 26C2 contacts the second clamp C2, the operation cable 26 is supported so that the terminal end portion does not drop out of the second clamp C2. Accordingly, the looped portion of the operation cable 26 is maintained. Because the first stopper 26C1 and the second stopper 26C2 are fitted to the outer tube 26A of the operation cable 26 as described above, a movement amount, by which the terminal end portion of the operation cable 26 is moved toward and away from the second clamp C2, is limited to a clamp range Ca between the first stopper 26C1 and the second stopper 26C2.

Thus, when the operator performs the operation of connecting the terminal end portion of the operation cable 26 to the operation lever L, even if the operator releases the operation cable 26, the looped portion of the operation cable 26 is maintained. Also, even if the operator applies the operational force to the operation cable 26 to pull out the terminal end portion of the operation cable 26 from the opening portion Ja of the vehicle-body side portion J with a certain strong force, the operation cable 26 is pulled out by a required amount without damaging the operation cable 26 (refer to FIG. 11).

Figure 5:
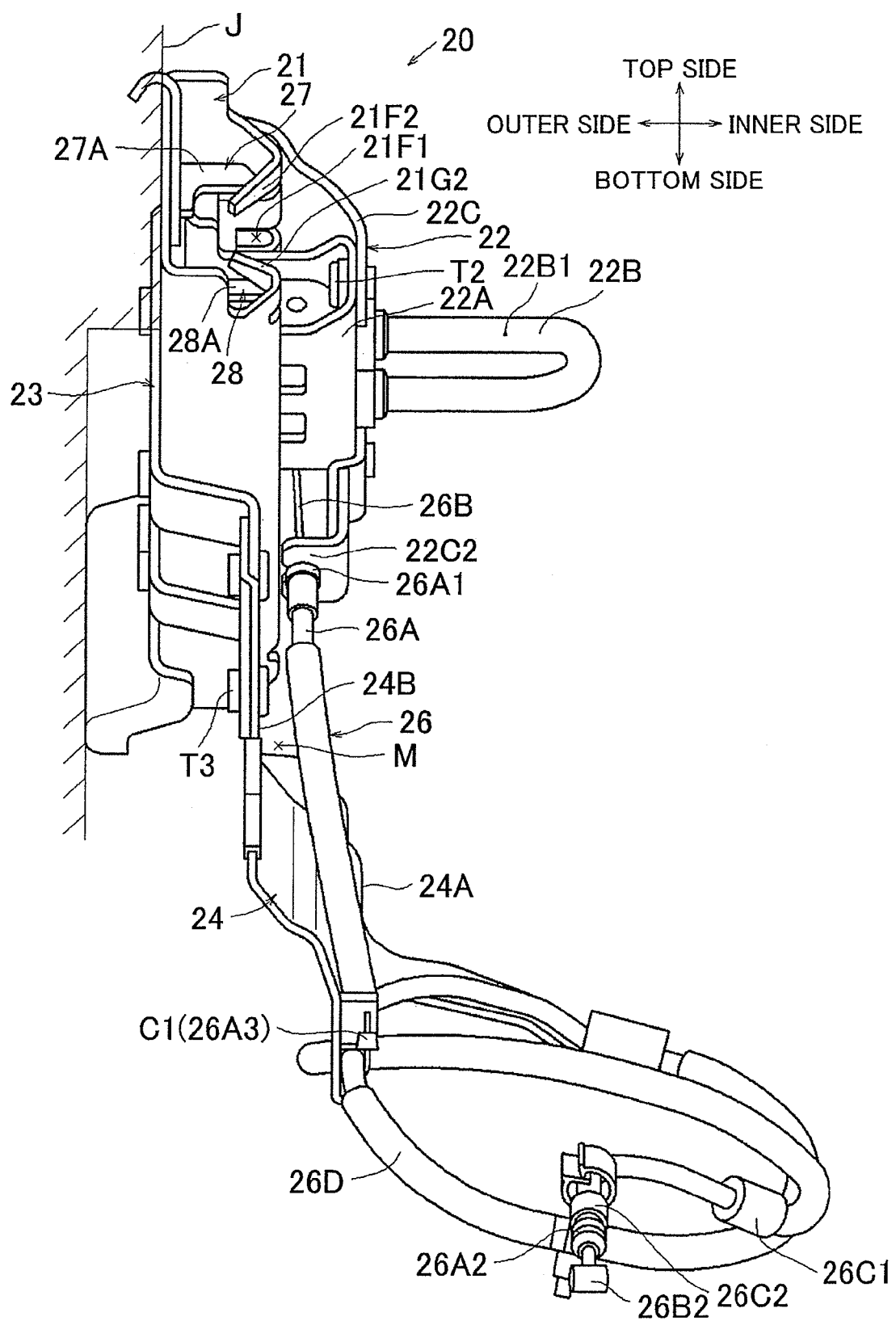
FIG. 5 is a side view showing the slider device seen from a front side of the vehicle.

As shown in FIG. 5, the attachment bracket 24 in the form of a plate, on which the operation cable 26 is routed and fixed, is formed by cranking the plate. The attachment bracket 24 has a fitting portion 24A which contacts the operation cable 26, and to which the operation cable 26 is fitted; and a non-contact portion 24B that is away from the operation cable 26, and does not contact the operation cable 26. That is, the attachment bracket 24 has a stepped shape. More specifically, the non-contact portion 24B is recessed with respect to the fitting portion 24A. The non-contact portion 24B is disposed in a region where a portion of the outer tube 26A of the operation cable 26, which is near the one end portion 26A1, extends. Thus, the portion of the outer tube 26A, which extends in the region where the non-contact portion 24B is disposed, does not contact the attachment bracket 24.

Thus, when the slide member 22 is slid forward and rearward along the slide rail 21, and the portion of the outer tube 26A of the operation cable 26, which is near the one end portion 26A1, is deflected and deformed to a large extent in accordance with the forward and rearward sliding movement, there is a gap M between the portion of the outer tube 26A and the non-contact portion 24B, and thus, the portion of the outer tube 26A does not contact the non-contact portion 24B. The outer tube 26A is bent to a large extent so that the portion of the outer tube 26A, which is near the one end portion 26A1 and extends through the region where the non-contact portion 24B is disposed, is directed toward the top side of the vehicle, and a portion of the outer tube 26A, which extends from a fixed portion 26A3 and is disposed on the fitting portion 24A, is directed toward the front side of the vehicle. Thus, the outer tube 26A is routed so that the portion of the outer tube 26A, which is located between the fixed portion 26A3 and the one end portion 26A1, has the extra length due to the bending.

The portion of the outer tube 26A, which extends from the fixed portion 26A3 disposed on the fitting portion 24A to the one end portion 26A1 connected to the slide member 22, is not routed in parallel with the fitting portion 24A. The portion of the outer tube 26A, which extends from the fixed portion 26A3 to the one end portion 26A1, is gradually inclined toward the non-contact portion 24B. Thus, as compared to the case where the portion of the outer tube 26A extends straight in parallel with the fitting portion 24A, the overall length of the outer tube 26A is made long due to the inclination, and the radius of the curve of the outer tube 26A is large when the outer tube 26 A is deflected and deformed.

When the slide member 22 is slid forward and rearward, the outer tube 26A is deflected and deformed so that the radius of the curve of the outer tube 26A is large, and mainly the portion of the outer tube 26 A, which is near the one end portion 26A1, pivots forward and rearward around a bending point 26A4 between the fixed portion 26A3 and the one end portion 26A1. At this time, even when the slide member 22 is repeatedly slid forward and rearward, the portion of the outer tube 26A, which is near the one end portion 26A1 and pivots to a large extent, does not contact the non-contact portion 24B of the attachment bracket 24. Therefore, the outer tube 26A is not likely to be worn due to the sliding movement. Also, because the fixed portion 26A3, which seldom pivots, is fixed on the fitting portion 24A of the attachment bracket 24, when the portion of the outer tube 26A pivots, an excessive load is not likely to be applied to the outer tube 26A.

Referring back to FIG. 2, the upper resin member 27 and the lower resin member 28 are provided between the slide member 22 and the slide rail 21. Each of the upper resin member 27 and the lower resin member 28 is elongate, and has an L-shaped cross section. The upper resin member 27 and the lower resin member 28 are functional components that reduce contact resistance when the slide member 22 is slid forward and rearward along the slide rail 21. The upper resin member 27 and the lower resin member 28 have the same size and the same shape.

Both of the upper resin member 27 and the lower resin member 28 are fitted to the slider 22A of the slide member 22, and are slid forward and rearward integrally with the slider 22A along the slider rail 21. More specifically, as shown in FIGS. 4A and 4B, the upper resin member 27 is disposed in a gap between an L-shaped portion of the slider 22A, which is formed by the upper side surface portion 22A4 and the upper fin surface portion 22A6, and an L-shaped portion of the slide rail 21, which is formed by the side surface portion 21C and the upper surface portion 21A. The upper resin member 27 is in surface contact with each of the surfaces. The upper resin member 27 fills a gap in a height direction (i.e., a gap between the upper fin surface portion 22A6 and the upper surface portion 21A) and a gap in a width direction (i.e., a gap between the upper side surface portion 22A4 and the side surface portion 21C), thereby preventing backlash.

The lower resin member 28 is disposed in a gap between an L-shaped portion of the slider 22A, which is formed by the lower side surface portion 22A5 and the lower fin surface portion 22A7, and an L-shaped portion of the slide rail 21, which is formed by the side surface portion 21C and the lower surface portion 21B. The lower resin member 28 is in surface contact with each of the surfaces. The lower resin member 28 fills a gap in the height direction (i.e., a gap between the lower fin surface portion 22A7 and the lower surface portion 21B) and a gap in a width direction (i.e., a gap between the lower side surface portion 22A5 and the side surface portion 21C), thereby preventing backlash.

Also, as shown in FIG. 2, front end engagement surfaces 27A and 28A in the form of walls are provided at front end portions of the upper resin member 27 and the lower resin member 28 in the longitudinal direction thereof, respectively, and rear end engagement surfaces 27B and 28B in the form of walls are provided at rear end portions of the upper resin member 27 and the lower resin member 28 in the longitudinal direction thereof, respectively. The front end engagement surfaces 27A and 28A contact the front end surface of the slider 22A. The rear end engagement surfaces 27B and 28B contact the rear end surface of the slider 22A. Thus, the upper resin member 27 and the lower resin member 28 are engaged with the slider 22A in a manner such that the slider 22A is sandwiched between the front end engagement surfaces 27A and 28A at the front side, and the rear end engagement surfaces 27B and 28B at the rear side. Thus, the upper resin member 27 and the lower resin member 28 are slid forward and rearward integrally with the slider 22A.

More specifically, as shown in FIG. 4A, the upper resin member 27 is disposed in a manner such that the upper resin member 27 is in surface contact with the upper inclined surface portion 21D of the slide rail 21, and an upper constricted inclined surface 22A8, in addition to the above-described surfaces. The upper constricted inclined surface 22A8 is an inclined surface formed in a constricted portion of the slider 22A to face the upper inclined surface portion 21D. Similarly, the lower resin member 28 is disposed in a manner such that the lower resin member 28 is in surface contact with the lower inclined surface portion 21E of the slide rail 21, and a lower constricted inclined surface 22A9, in addition to the above-described surfaces. The lower constricted inclined surface 22A9 is an inclined surface formed in a constricted portion of the slider 22A to face the lower inclined surface portion 21E.

Thus, the slider 22A is inserted in the slide rail 21 in a manner such that the there is no gap in the height direction and no gap in the width direction between the slider 22A and the slide rail 21, using the upper resin member 27 and the lower resin member 28. More specifically, there is no gap between the upper fin surface portion 22A6 and the upper surface portion 21A, and between the lower fin surface portion 22A7 and the lower surface portion 21B, and there is no gap between the upper side surface portion 22A4 and the side surface portion 21C, and between the lower side surface portion 22A5 and the side surface portion 21C. As shown in FIG. 2, rubbers 27C are disposed to protrude at two positions in a longitudinal direction, in a portion of the upper resin member 27, which faces the upper fin surface portion 22A6 of the slider 22A. The rubbers 27C press the upper fin surface portion 22A6, thereby applying an elastic support force to the upper fin surface portion 22A6.

Figure 6:
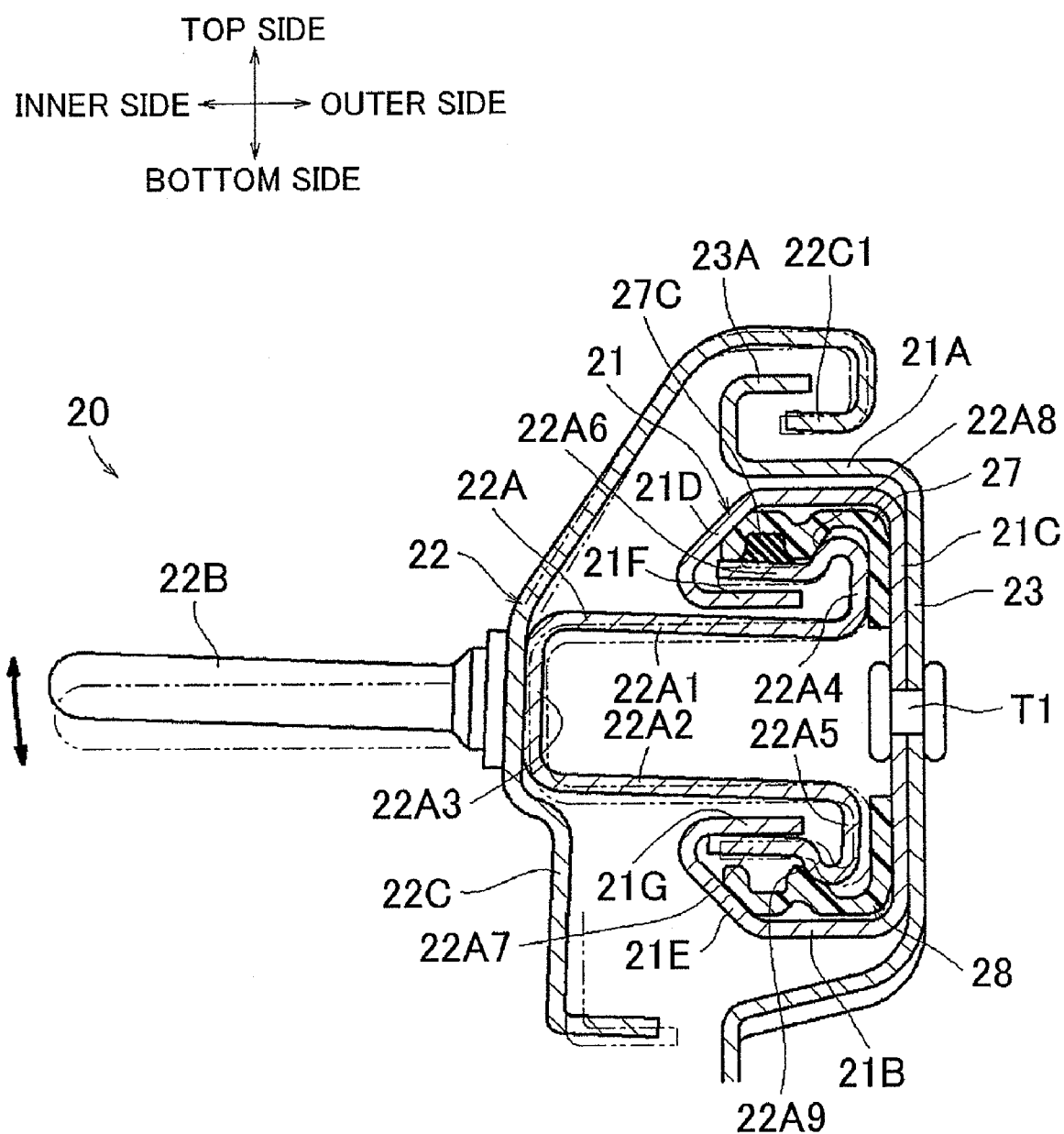
FIG. 6 is a schematic diagram showing a manner in which the slide member is tilted while deforming rubbers.

As shown in FIG. 6, the rubbers 27C are normally in contact with the upper fin surface portion 22A6 of the slider 22A, and maintain the attitude of the slider 22A to maintain the striker 22B in a state in which the striker 22B extends straight and perpendicularly to the slide rail 21 (i.e., the striker 22B extends in a horizontal direction). When the striker 22B is pressed by an acting force directed upward (described later), and tilted, the rubbers 27C elastically receive the tilting movement of the slider 22A while the rubbers 27C are pressed by the upper fin surface portion 22A6 of the slider 22A, and compressed and deformed.

As described with reference to FIG. 1, the seatback 2 tilts and pivots toward the front side and the rear side of the vehicle around the connection point 2R at which the seatback 2 is hinge-connected to the seat cushion 3. Thus, the seatback 2 pivots along an arc locus A1. The slide member 22 is engaged with the lock device 10 provided at the rear portion of the seatback 2, and is slid straight and obliquely toward the front side and rear side of the vehicle along the shape of the slide rail 21, that is, the slide member 22 moves along a straight-line locus A2.

Thus, the lock device 10 and the slide member 22 are engaged with each other, and move in association with each other, and the locus A1 of the lock device 10 is different from the locus A2 of the slide member 22. Therefore, engagement positions of the lock device 10 and the slide member 22 change in a height direction, in accordance with a change in the position of the slide member 22. Accordingly, in the embodiment, the slide member 22 is configured so that the slide member 22 pivots with respect to the slide rail 21. Thus, the difference between the engagement positions of the lock device 10 and the slide member 22 is absorbed by the pivoting movement of the slide member 22.

More specifically, in the embodiment, when the slide member 22 is located at a slide lock position at the front side of the slide rail 21, the locus A1 of the lock device 10 intersects with the locus A2 of the slide member 22 (in a precise sense, the locus A1 of a center portion of a recessed portion 11A in the lock device 10 intersects with the locus A2 of the engagement portion 22B1 of the striker 22B in the slide member 22). When the slide member 22 is located at this position, the engagement position of the slide member 22 in the height direction matches the engagement position of the lock device 10 in the height direction, and thus, the slide member 22 is engaged with the lock device 10 without the need of pivoting.

However, as shown by virtual lines in FIG. 1, when the slide member 22 is slid rearward from the slide lock position at the front end side of the slide rail 21, the relation between the positions of the lock device 10 and the slide member 22 in the height direction changes, that is, the lock device 10 moves to a position higher than the position of the slide member 22. Accordingly, in order to absorb the difference between the engagement positions of the slide member 22 and the lock device 10 in the height direction, a displacement force for forcibly displacing the slide member 22 is applied to the slide member 22 in a direction (in an upward direction in FIG. 1) so that the engagement position of the slide member 22 matches the engagement position of the lock device 10.

Accordingly, when the slide member 22 receives the displacement force, the slide member 22 pivots with respect to the upper resin member 27 and the lower resin member 28 around a contact point at which the slide member 22 contacts the upper resin member 27 and the lower resin member 28, as shown in FIG. 6. At this time, the slide member 22 pivots while pressing and deforming the rubbers 27C provided on the upper resin member 27. Thus, when the slide member 22 pivots while elastically compressing and deforming the rubbers 27C, the difference between the engagement positions of the slide member 22 and the lock device 10 in the height direction is absorbed.

Figure 7:
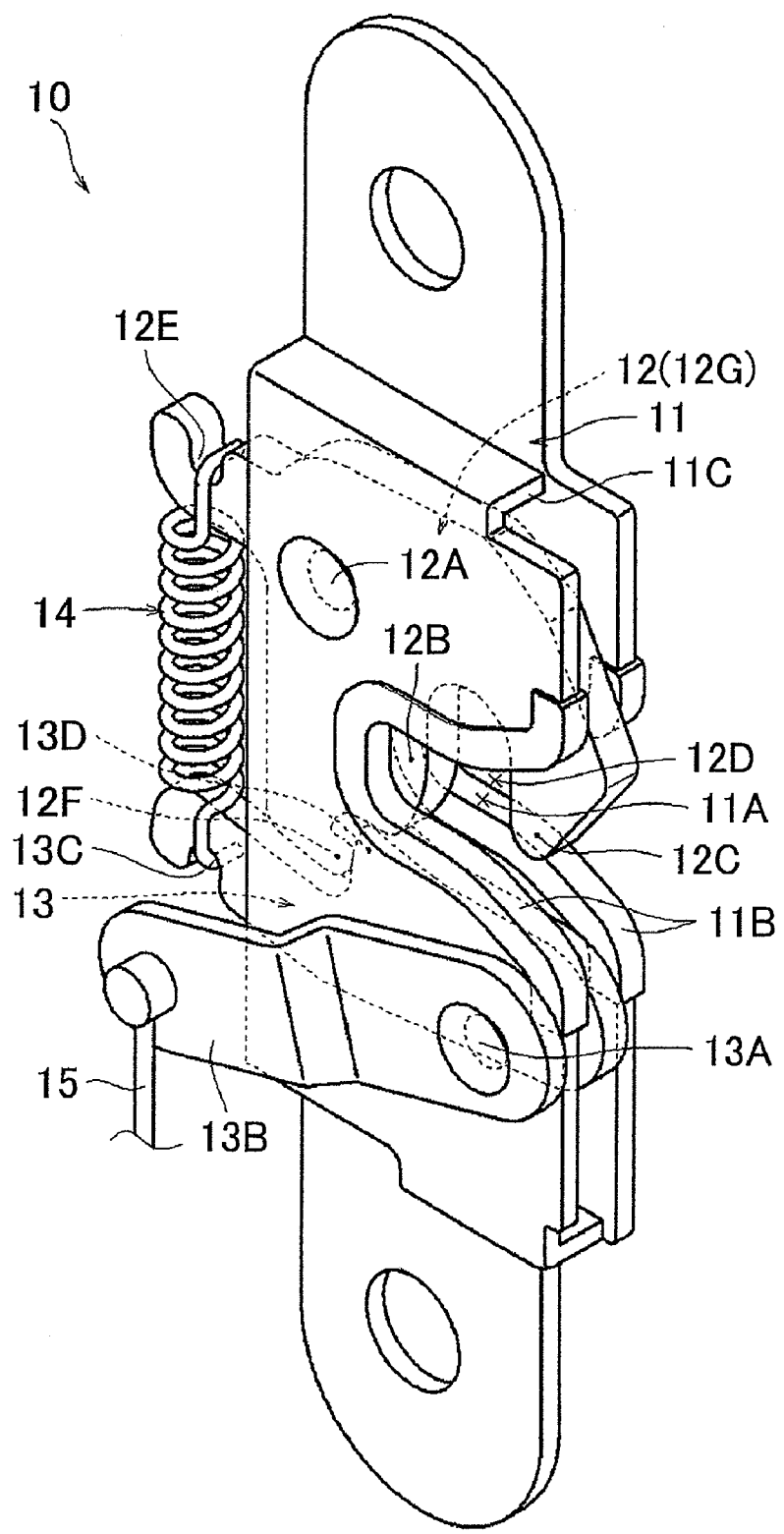
FIG. 7 is a perspective view showing an entire lock device.

Subsequently, the configuration of the lock device 10 will be described with reference to FIG. 7 to FIG. 10. As shown in FIG. 7, the lock device 10 is configured by combining a base plate 11 connected to a framework of the seatback 2 (refer to FIG. 1); a hook 12 that is rotatably supported and connected to the base plate 11 by a first support shaft 12; a pawl 13 that is rotatably supported and connected to the base plate 11 by a second support shaft 13A; and a tension spring 14 that is disposed between the pawl 13 and the hook 12 and hung on the pawl 13 and the hook 12, to apply a force in such a direction that the pawl 13 and the hook 12 are rotated and drawn toward each other.

First, the schematic configuration of each constituent component will be described. As evident from the comparison between FIG. 8 and FIG. 9, when (the engagement portion 22B1 of) the striker 22B is moved into the recessed portion 11A formed in the base plate 11, the striker 22B presses and moves an upper jaw portion 12B upward so that the upper jaw portion 12B is rotated. Accordingly, a lower jaw portion 12C of the hook 12 is moved to a position behind the striker 22B. Thus, the recessed portion 11A is closed by the lower jaw portion 12C in a manner such that the striker 22B is received by a receiving portion 12D between the upper jaw portion 12B and the lower jaw portion 12C. Because the recessed portion 11A is closed by the lower jaw portion 12C, the striker 22B is held between the lower jaw portion 12C and the recessed portion 11A in the hook 12 (refer to FIG. 9).

Figure 8:
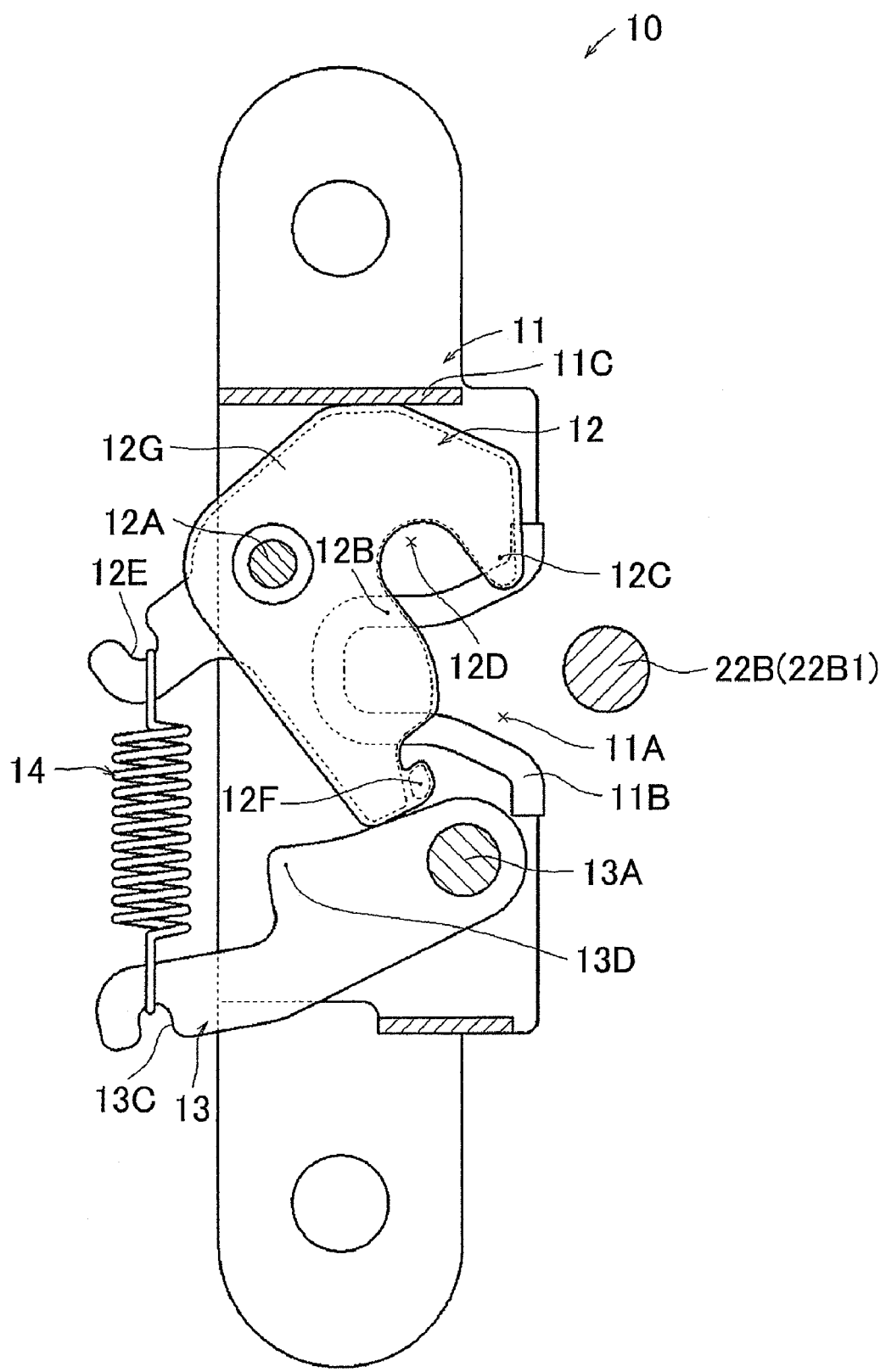
FIG. 8 is a partial sectional view showing the lock device before the lock device is brought to a locking state.
Figure 9:
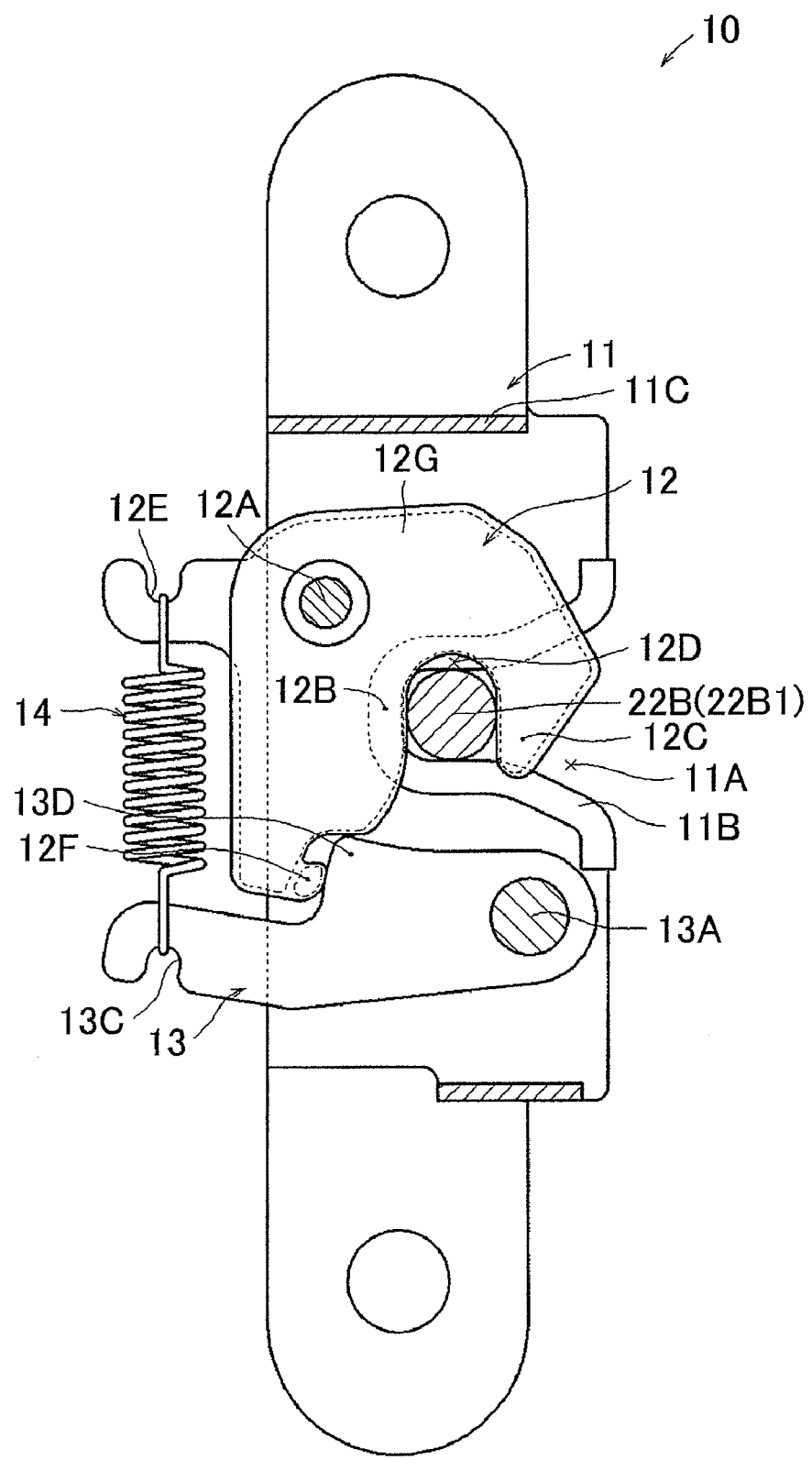
FIG. 9 is a partial sectional view showing the lock device in the locking state.

As shown in FIG. 9, when the hook 12 is rotated up to a position at which the striker 22B is held between the lower jaw portion 12C and the recessed portion 11A, the pawl 13 is rotated due to the urging force of the tension spring 14, and a corner portion 13D of the pawl 13 contacts a corner portion 12F of the hook 12. Thus, the hook 12 is restricted from returning to a position shown in FIG. 8 by the urging force of the tension spring 14, that is, the hook 12 is locked. Hereinafter, the detailed configuration of each of the above-described constituent components will be described.

As shown in FIG. 7, the base plate 11 includes a pair of plate members. The operational components, such as the hook 12 and the pawl 13, are held between the pair of plate members. The recessed portion 11A, which receives the striker 22B, is formed in the base plate 11 by cutting out a substantially triangle portion from the base plate 11. Resin covers 11B are fitted to the recessed portion 11A to elastically receive the striker 22B that has moved into the recessed portion 11A. Further, a stopper 11C is formed in the base plate 11, and the stopper 11C stops the rotation of the hook 12 before the hook 12 is locked (refer to FIG. 8).

Figure 10:
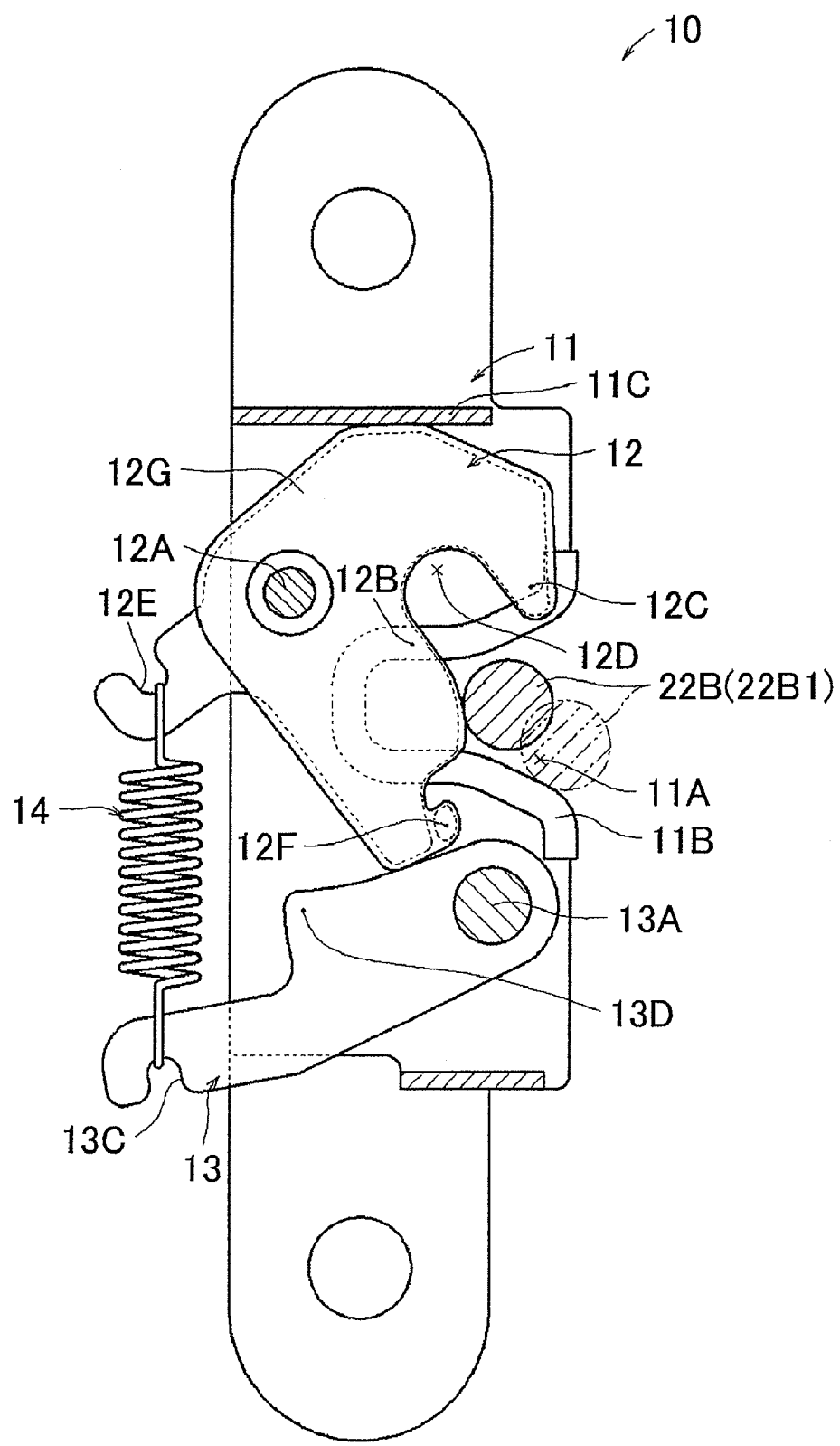
FIG. 10 is a partial sectional view showing a manner in which the lock device, whose engagement position has been offset from the position of a striker in a height direction, locks the striker.

The recessed portion 11A is formed in the base plate 11 so that the diameter, in the height direction, of the receiving portion that receives the striker 22B is gradually increased toward an opening side, that is, the receiving portion is formed by an inclined surface, and is expanded toward the opening side. As shown in FIG. 8 to FIG. 10, in the sectional view of the lock device 10, an upper edge of the receiving portion of the recessed portion 11A obliquely extends upward, and a lower edge of the receiving portion obliquely extends downward. Thus, as shown in FIG. 10, even when the striker 22B is moved into the receiving portion of the recessed portion 11A from a position offset in the height direction from a center portion of the receiving portion of the recessed portion 11A, the striker 22B hits the inclined surface that forms the receiving portion of the recessed portion 11A, and the striker 22B is moved and guided toward the center portion of the receiving portion of the recessed portion 11A along the shape of the inclined surface. As a result, the striker 22B is moved into the receiving portion.

Subsequently, referring back to FIG. 7, the hook 12 will be described. The hook 12 is rotatably connected to the base plate 11 by the first support shaft 12A. As shown in FIG. 8, before the striker 22B is moved into the recessed portion 11A of the base plate 11, the hook 12 is normally urged in the counterclockwise direction in FIG. 8 by the urging force of the tension spring 14 provided between the hook 12 and the pawl 13. Thus, the hook 12 is maintained in an initial rotational position in which the hook 12 contacts the stopper 11C formed in the base plate 11.

One end portion of the tension spring 14 is hung on a hooking portion 12E that is formed to protrude at an outer peripheral edge portion of the hook 12 shown in the left side of FIG. 7. The other end portion of the tension spring 14 is hung on a hooking portion 13C formed at a distal end portion (i.e., an end portion shown in the left side of FIG. 7) of the arm-shaped pawl 13. In the hook 12, the upper jaw portion 12B and the lower jaw portion 12C are formed. When the hook 12 is in the initial rotational position shown in FIG. 8, the upper jaw portion 12B projects into the recessed portion 11A of the base plate 11. When the striker 22B is moved into the recessed portion 11A, and accordingly, the upper jaw portion 12B is pressed and moved in the clockwise direction as shown in FIG. 9, the lower jaw portion 12C is rotated to close the recessed portion 11A.

The corner portion 12F, which is a protruding stepped portion, is formed at the outer peripheral edge of the hook 12 shown in the lower side of FIG. 9. As shown in FIG. 9, when the lower jaw portion 12C of the hook 12 is rotated up to the position at which the lower jaw portion 12C closes the recessed portion 11A, the corner portion 13D of the pawl 13 contacts a curved portion provided between the upper jaw portion 12B and the protruding corner portion 12F. As a result, the hook 12 is pressed to the pawl 13 in the counterclockwise direction in FIG. 9, and thus, the rotation of the hook 12 in the counterclockwise direction is prevented.

The entire hook 12 excluding the hooking portion 12E is covered by a resin cover 12G. Thus, when the striker 22B contacts the upper jaw portion 12B and the lower jaw portion 12C, and when the corner portion 13D of the pawl 13 contacts the hook 12, the impact is reduced. Next, referring back to FIG. 7, the pawl 13 will be described. The pawl 13 is rotatably connected to the base plate 11 by the second support shaft 13A.

As shown in FIG. 8, before the striker 22B is moved into the recessed portion 11A of the base plate 11, the pawl 13 is normally urged in the clockwise direction due to the urging force of the tension spring 14 disposed between the pawl 13 and the hook 12. Thus, the pawl 13 is maintained in an initial rotational position in which the upper portion of the pawl 13 is pressed to the corner of the hook 12. The striker 22B is moved into the recessed portion 11A of the base plate 11, and the hook 12 starts to rotate toward the position at which the lower jaw portion 12C closes the recessed portion 12A (refer to FIG. 9).

As a result, the corner portion 13D, which is formed in an intermediate portion of the arm-shaped pawl 13, contacts the curved portion provided between the upper jaw portion 12B and the protruding corner portion 12F of the hook 12 due to the urging force of the tension spring 14. Thus, the corner portion 13D is pressed to the curved portion provided between the upper jaw portion 12B and the corner portion 12F of the hook 12, thereby preventing the hook 12 from rotating in the counterclockwise direction in FIG. 9 due to the urging force of the tension spring 14. Thus, the lock device 10 is engaged with the striker 22B, that is, the lock device 10 locks the striker 22B.

As shown in FIG. 7, when a disengagement cable 15 hung on a distal end portion of an operation arm 13B integrally connected to the pawl 13 is pulled by a disengagement lever (not shown) provided on the vehicle seat 1 (refer to FIG. 1), the lock device 10 is disengaged from the striker 22B. The operation arm 13B and the pawl 13 are integrally connected to the second support shaft 13A. Because the second support shaft 13A is rotatably connected to the base plate 11, the operation arm 13B is rotated integrally with the pawl 13.

Accordingly, as shown in FIG. 7, when the operation arm 13B with the above-described configuration is rotated in the counterclockwise direction (in FIG. 7) around the second support shaft 13A due to the operation of pulling the disengagement cable 15, the pawl 13 is also rotated in the counterclockwise direction. Thus, as shown in FIG. 8, the corner portion 13D of the pawl 13, which has been pressed to the curved portion provided between the upper jaw portion 12B and the corner portion 12F of the hook 12 (refer to FIG. 9), is moved away from the curved portion. Thus, the hook 12 is disengaged from the pawl 13, that is, the hook 12 is unlocked.

As a result, the hook 12 is rotated in the counterclockwise direction (in FIG. 9) due to the urging force of the tension spring 14, and the upper jaw portion 12B ejects the striker 22B from the recessed portion 11A of the base plate 11. Thus, the hook 12 is disengaged from the striker 22B. Then, when the operation of pulling the disengagement cable 15 (refer to FIG. 7) is stopped, the lock device 10 is brought to an initial state in which the upper portion of the pawl 13 is pressed to the corner of the hook. 12. Thus, the lock device 10 is brought back to a lockable state. That is, when the striker 22B is moved into the recessed portion 11A again, the lock device is engageable with the striker 22B.

Thus, in the vehicle seat reclining apparatus according to the embodiment, the operation cable 26 is routed in a manner such that the outer tube 26A is fitted to the fitting portion 24A of the attachment bracket 24 (attachment member), and the portion of the outer tube 26A from the fixed portion 26A3 fixed to the fitting portion 24A to the one end portion 26A1 (movable portion) connected to the slide member 22 extends through the region where the non-contact portion 24B is disposed, and does not contact the non-contact portion 24B. The non-contact portion 24B is depressed with respect to the fitting portion 24A. Thus, the portion of the outer tube 26A that pivots integrally with the slide member 22 (i.e., the portion of the outer tube 26A from the bending point 26A4 to the one end portion 26A1) does not contact the attachment bracket 24. This reduces friction due to contact.

As shown in FIG. 3, the operation cable 26 is bent into an arc shape (or a curved shape) so that the direction in which the fixed portion 26A3 of the outer tube 26A is directed (i.e., the direction toward the front of the vehicle) is substantially perpendicular to the direction in which the one end portion 26A1 (movable portion) is directed (i.e., the direction toward the top of the vehicle). Thus, the fixed portion 26A3 and the one end portion 26A1 are directed so that the bending direction is not likely to be changed when the slide member 22 is slid in the range of movement. Therefore, as compared to the case where the fixed portion 26A3 and the one end portion 26A1 (movable portion) of the outer tube 26A are directed in the same direction, the radius of the curve of the operation cable 26 is large when the operation cable 26 is deflected and deformed. Accordingly, it is possible to reduce the load applied to the operation cable 26 due to the curve of the operation cable 26. In the embodiment, the portion of the operation cable 26, which is near the fixed portion 26A3 fitted to the attachment bracket 24, is directed in the same direction as the direction in which the slide member 22 is slid. With the configuration, when the slide member 22 is slid in the range of movement, the bending direction of the operation cable 26 is not likely to be changed. In other words, the bending direction of the operation cable 26 is not likely to be reversed.

Thus, because the operation cable 26 is bent in advance in the above-described manner, that is, the fixed portion 26A3 and the one end portion 26A1 are directed so that the bending direction is not likely to be changed when the slide member 22 is slid in the range of movement, the operation cable 26 is more unlikely to contact the non-contact portion 24B of the attachment bracket 24.

Also, the portion of the operation cable 26, which extends from the position on the fitting portion 24A of the attachment bracket 24 through the region where the non-contact portion 24B is disposed, is gradually inclined toward the non-contact portion 24B. That is, the portion of the outer tube 26A from the bending point to the one end portion 26A1 is gradually inclined toward the non-contact portion 24B. Thus, as compared to the case where the operation cable 26 extends in a straight line from the position on the fitting portion 24A, the radius of the curve of the operation cable 26 is large when the operation cable 26 is deflected and deformed. Accordingly, it is possible to reduce the load applied to the operation cable 26 due to the curve of the operation cable 26.

Although the embodiment of the invention has been described, the invention may be realized in various embodiments in addition to the above-described embodiment. For example, although the lock device 10 that engages with, and locks the striker 22B is used as the engagement device in the above-described embodiment, devices that engage with the slide member 22 in the other various manners may be employed as the engagement device. Also, although the operation cable 26 is routed so that the direction in which the fixed portion 26A of the outer tube 26 is directed is perpendicular to the direction in which the one end portion 26A1 (movable portion) is directed, the operation cable 26 may be routed so that the fixed portion 26A and the one end portion 26A1 are directed in the same direction.

What is claimed is:

1. A vehicle seat reclining apparatus comprising:
   an engagement device provided at a seatback;
   a slider that is provided at a vehicle-body side portion, and that is engaged with the engagement device;
   a slide rail which is provided at the vehicle-body side portion, and along which the slider is slid forward and rearward, wherein the seatback is tilted in a direction in which the slider is slid, and tilting of the seatback is stopped and the seatback is held by restricting the slider from being slid along the slide rail;
   a lock provided at the slider, wherein the slider is locked by engaging the lock with the slide rail;
   an operation cable that is connected to the lock, wherein the lock is disengaged from the slide rail by operating the operation cable; and
   an attachment bracket which is connected to the slide rail, and to which the operation cable is fitted,
   wherein
   the attachment bracket has a stepped shape, and includes a fitting portion which contacts the operation cable, and to which the operation cable is fitted, and a non-contact portion that is recessed with respect to the fitting portion, and that is away from the operation cable and does not contact the operation cable; and
   a portion of the operation cable from a fixed portion to a movable portion extends through a region where the non-contact portion is disposed, and does not contact the non-contact portion, the fixed portion being fixed at a position on the fitting portion of the attachment bracket, and the movable portion being connected to the slider,
   wherein the non-contact portion of the attachment bracket shields the operation cable, so that a clearance is maintained around the operation cable at least on one side of the operation cable facing the attachment bracket, and
   the portion of the operation cable, which extends from the position on the fitting portion of the attachment bracket through the region where the non-contact portion is disposed, is gradually inclined toward the non-contact portion.

2. The vehicle seat reclining apparatus according to claim 1, wherein
   the operation cable is bent into a curved shape so that a direction in which the fixed portion of the operation cable is directed is substantially perpendicular to a direction in which the movable portion of the operation cable is directed; and
   when the slider is slid in a range of movement thereof, a bending direction of the operation cable is not reversed.

3. The vehicle seat reclining apparatus according to claim 1, wherein
the operation cable is bent into an arc shape so that a direction in which the fixed portion of the operation cable is directed is substantially perpendicular to a direction in which the movable portion of the operation cable is directed; and
when the slider is slid in a range of movement thereof, a bending direction of the operation cable is not reversed.

4. The vehicle seat reclining apparatus according to claim 1, wherein
a portion of the operation cable, which is near the fixed portion, is directed in a substantially same direction as the direction in which the slider is slid.

5. The vehicle seat reclining apparatus according to claim 1, wherein
The attachment bracket is fixed to the slide rail;
the operation cable is bent into a shape so that when the slider is slid in a range of movement thereof, a bending direction of the operation cable is not reversed; and
the non-contact portion of the attachment bracket forms a shield surface facing the operation cable, with the shield surface substantially parallel to the bending direction of the operation cable, so that a clearance is maintained between the operation cable and the non-contact portion of the attachment bracket.

* * * * *